(12) United States Patent
Seyffarth et al.

(10) Patent No.: US 8,447,073 B2
(45) Date of Patent: May 21, 2013

(54) PROCESS FOR THE AUTOMATIC LONGITUDINAL GUIDANCE OF A MOTOR VEHICLE

(75) Inventors: Torsten Seyffarth, Munich (DE); Marc Walessa, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 262 days.

(21) Appl. No.: 13/041,878

(22) Filed: Mar. 7, 2011

(65) Prior Publication Data
US 2011/0228986 A1    Sep. 22, 2011

(30) Foreign Application Priority Data

Mar. 16, 2010    (DE) .......................... 10 2010 002 929

(51) Int. Cl.
*G06K 9/00* (2006.01)
*G06F 7/00* (2006.01)

(52) U.S. Cl.
USPC .............................. 382/104; 382/291; 701/36

(58) Field of Classification Search
USPC ................. 382/100, 103–107, 155, 162, 168, 382/170, 173, 181–182, 199, 203, 224, 232, 382/254, 274, 276, 291, 305, 312; 340/12.25; 701/1, 423, 45, 301, 36
See application file for complete search history.

(56) References Cited

U.S. PATENT DOCUMENTS

| 7,640,108 | B2 * | 12/2009 | Shimizu et al. ............... 701/301 |
| 7,663,502 | B2 * | 2/2010 | Breed ......................... 340/12.25 |
| 7,899,616 | B2 * | 3/2011 | Breed ........................... 701/423 |
| 8,065,053 | B2 * | 11/2011 | Stam et al. ...................... 701/36 |
| 2008/0195257 | A1 * | 8/2008 | Rauch ............................... 701/1 |
| 2009/0192686 | A1 | 7/2009 | Niehsen et al. |
| 2010/0094509 | A1 * | 4/2010 | Luke et al. ...................... 701/45 |

FOREIGN PATENT DOCUMENTS

| DE | 103 24 895 A1 | 12/2004 |
| DE | 10 2005 045 017 A1 | 3/2007 |
| DE | 10 2007 039 377 A1 | 2/2009 |
| DE | 10 2007 049 706 A1 | 4/2009 |
| EP | 2 028 632 A2 | 2/2009 |
| WO | WO 2007/033870 A1 | 3/2007 |

OTHER PUBLICATIONS

German Search Report dated Oct. 26, 2010 including partial English-language translation (Nine (9) pages).

* cited by examiner

*Primary Examiner* — Seyed Azarian
(74) *Attorney, Agent, or Firm* — Crowell & Moring LLP

(57) ABSTRACT

For the automatic longitudinal guidance of a motor vehicle having a longitudinally guiding driver assistance system with a stop-and-go function, at least starting from a point-in-time wherein the motor vehicle is stopped, the vehicle apron is continuously monitored for possible obstacles by a monitoring device having a camera which supplies a sequence of individual images of the vehicle apron. For the detection of obstacles in the vehicle apron, characteristic image features are extracted from the individual images and are tracked with respect to time within the sequence of individual images, and an appearance and/or disappearance of one or more characteristic image features taking place in the course of the sequence is determined and evaluated. Additionally or alternatively, a change of a spatial distribution of one or more characteristic image features taking place in the course of the sequence in the respective individual image or in a cutout of the latter is determined and evaluated.

3 Claims, 1 Drawing Sheet

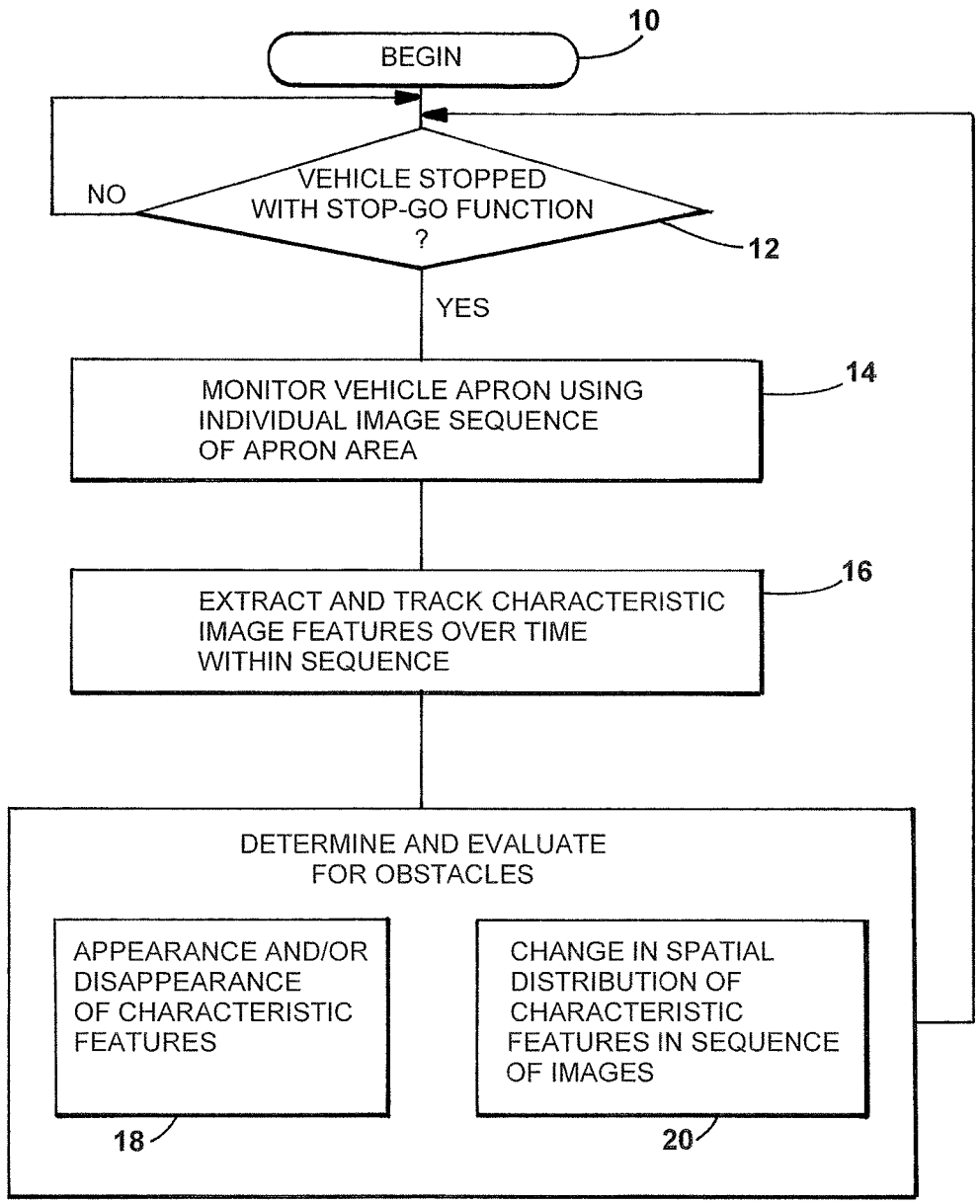

PROCESS FOR THE AUTOMATIC LONGITUDINAL GUIDANCE OF A MOTOR VEHICLE

CROSS-REFERENCE TO RELATED APPLICATION

This application claims priority under 35 U.S.C. §119 from German Patent Application No. DE 10 2010 002 929.7, filed Mar. 16, 2010, the entire disclosure of which is herein expressly incorporated by reference.

BACKGROUND AND SUMMARY OF THE INVENTION

The invention relates to a process for the automatic longitudinal guidance of a motor vehicle by way of a longitudinally guiding driver assistance system having a stop-and-go function. Using a detection device of the driver assistance system, information is detected concerning a vehicle driving ahead. By way of the driver assistance system, the motor vehicle is automatically braked to a standing position as a function of the information detected by the detection device. When the new starting-up of the vehicle driving ahead is detected, the motor vehicle is automatically started again possibly as a function of a confirmation signal that can be given by the driver by way of an input device. At least starting from the point in time of the stoppage of the motor vehicle, the vehicle apron is continuously monitored with respect to possible obstacles situated in the vehicle apron by use of a monitoring device having a camera which supplies a sequence of individual images of the vehicle apron.

Such a process is known from EP 2 028 632 A2. In that process, for the detection of obstacles, either differential images are created from a respective first individual image and a second individual image that is taken after the first individual image and are evaluated or, for the detection of obstacles, the vectors of the optical flux of the image information of at least one portion of the image elements of two individual images taken after one another and composed of individual image elements are determined and evaluated.

A similar process is also described in International Patent Document WO 2007/033870 A1.

It is an object of the invention to improve a process for the automatic longitudinal guidance of a motor vehicle with respect to ensuring the safety of the automatic new starting-up.

This and other objects are achieved by a process for the automatic longitudinal guidance of a motor vehicle by a longitudinally guiding driver assistance system having a stop-and-go function, wherein information is detected concerning a vehicle driving ahead by a detection device of the driver assistance system, and wherein, the motor vehicle is automatically braked to a standing position as a function of the information detected by the detection device by the driver assistance system. When a new starting-up of the vehicle driving ahead is detected, the motor vehicle is automatically started again possibly as a function of a confirmation signal that can be given by the driver by way of an input device. Starting at least from the point in time of the stoppage of the motor vehicle, the vehicle apron is continuously monitored with respect to possible obstacles situated in the vehicle apron by a monitoring device comprising a camera which supplies a sequence of individual images of the vehicle apron. For the detection of obstacles in the vehicle apron, characteristic image features are extracted from the individual images and are tracked with respect to time within the sequence of individual images, and (1) an appearance and/or disappearance of one or more characteristic image features taking place in the course of the sequence is determined and evaluated, and/or (2) a change of a spatial distribution of one or more characteristic image features taking place in the course of the sequence in the respective individual image or in a cutout of the respective individual image is determined and evaluated.

For the detection of obstacles in the vehicle apron, according to an aspect of the invention, characteristic image features are extracted from the individual images and are tracked with respect to time within the sequence of individual images, and an appearance and/or disappearance of one or more characteristic image features taking place in the course of the sequence is determined and evaluated. Alternatively or additionally, a change of a spatial distribution of one or more characteristic image features taking place in the course of the sequence in the respective individual image or in a cutout of the latter is determined and evaluated.

The invention is based on the consideration that possible obstacles in the vehicle apron in all probability conceal individual characteristic image features (or the object features on which these characteristic image features are based). The appearance or the disappearance of such a concealment therefore most probably results in the appearance and/or disappearance of one or more, possibly even all characteristic image features. Likewise, the appearance or the disappearance of such a concealment will most probably result in a change of the spatial distribution of individual or all characteristic image features in the respective individual image or in a cutout of the individual image.

When the evaluation of the spatial distribution relates to an image cutout of the respective individual image, this image cutout is preferably defined in a constant manner for the evaluation of the entire sequence. In the simplest case, the image cutout is defined from the outset.

When the evaluation of the spatial distribution relates to an image cutout of the respective individual image, this image cutout is defined according to a preferred embodiment of the present invention by the spatial distribution of the characteristic image features in one or more individual images at the beginning of the sequence.

The evaluation of the spatial distribution preferably takes place such that a so-called feature signature is determined and evaluated from the spatial distribution and possibly additional characteristics of the image features. Preferably, the presence of an obstacle in the vehicle apron is inferred only from significant changes of the spatial distribution or of the feature signature. In the simplest case, the significance of a change can be measured by whether one or more characteristic quantities for the change of the spatial distribution or of the feature signature exceed an absolute or relative threshold.

Suitable characteristic image features are especially the corners and edges in the individual images.

In connection with the evaluation of the appearance and/or disappearance of one or more characteristic image features or in connection with the evaluation of the change of spatial distribution of one or more characteristic image features in the respective individual image or a cutout thereof, an object recognition and/or a scene interpretation is not required and can therefore be eliminated, whereby resources, computing time, energy and the expenditures of the process can be reduced.

The robustness of the process can be increased in that, for the detection of obstacles in the vehicle apron, additionally, differential images are generated and evaluated in each case from a first individual image and a second individual image taken after the first individual image.

The combination of the obstacle recognition on the basis of tracking characteristic image features with such a differential image process is surprising in that the differential image process is essentially based on evaluating image portions or image information of the taken individual images which relate to or show an obstacle, while the obstacle recognition on the basis of tracking characteristic image features is essentially based on evaluating image portions or image information of the taken individual images which specifically relate to or show no obstacles. In other words: as a rule, a differential image process has the purpose of obtaining obstacle information in a direct manner, while obstacles during the tracking of characteristic image features usually represent an interference and are recognized only indirectly because they falsify or hinder the tracking.

The robustness of the process according to the invention can be further increased in that additionally vectors of the optical flux of the image information of at least one portion of the image elements of two individual images taken after one another and composed of individual image elements are determined and evaluated.

Also the combination of the obstacle recognition on the basis of tracking characteristic image features with such a process on the basis of the optical flux is surprising in that the process on the basis of the optical flux is essentially based on evaluating image portions or image information of the taken individual images which relate to or show an obstacle, while the obstacle recognition on the basis of tracking characteristic image features is essentially based on evaluating image portions or image information of the taken individual images which specifically relate to or show no obstacles. In other words: as a rule, a process on the basis of the optical flux is used for obtaining obstacle information in a direct manner, while obstacles during the tracking of characteristic image features usually represent an interference and are recognized only indirectly because they falsify or hinder the tracking.

The robustness of the process according to the invention can be increased to a considerable extent in that, for the detection of obstacles in the vehicle apron, differential images are additionally generated and evaluated in each case from a first individual image and a second individual image taken after the first individual image, and additionally vectors of the optical flux of the image information of at least one portion of the image elements of two individual images taken one after another and composed of individual image elements are determined and evaluated.

When the obstacle recognition on the basis of tracking characteristic image features is combined with such a differential image process and/or such a process on the basis of the optical flux, the individual results of several processes are preferably jointly subjected to a plausibility check in order to determine a total result.

The robustness and/or quality of the process according to the invention can be further increased in that, additionally, signals of further camera devices and/or non-optical sensors at the vehicle, particularly ultrasound-based range sensors, are obtained and evaluated. A fusion of the individual processes can in each case take place on a signal plane, on a result plane or on a plane situated in-between.

Other objects, advantages and novel features of the present invention will become apparent from the following detailed description of one or more preferred embodiments when considered in conjunction with the accompanying drawing.

BRIEF DESCRIPTION OF THE DRAWING

The FIGURE is a flow chart illustrating an exemplary embodiment of the process according to the invention.

DETAILED DESCRIPTION OF THE DRAWING

Referring to the FIGURE, a process is provided for automatic longitudinal guidance of a motor vehicle via a longitudinally guiding driver assistance system having a stop-and-go function, wherein information is detected concerning a vehicle driving ahead by a detection device of the driver assistance system, and the motor vehicle may be automatically braked to a standing position as a function of the detected information by the driver assistance system. When the vehicle driving ahead again starts up, the motor vehicle is automatically again started possibly as a function of a confirmation signal that can be given by the driver via an input device. The process for detecting obstacles in an area of the vehicle apron begins (step 10) at least from the point-in-time wherein the motor vehicle is stopped with the stop-and-go function (step 12). The process then monitors the vehicle apron continuously via a camera equipped monitoring device that supplies a sequence of individual images of the vehicle apron (step 14). In an exemplary embodiment, obstacle detection in the apron area is performed by extracting characteristic image features from the individual images and tracking the characteristic image features over time within the sequence of individual images (step 16). The process may determine and evaluate the appearance and/or disappearance of one or more characteristic image features that takes place in the course of the sequence in order to detect obstacles (step 18). Alternatively or additionally, the process may determine and evaluate a spatial distribution change of one or more characteristic image features that occurs in the course of the sequence in the respective individual image or in a cutout of the respective individual image for detecting obstacles (step 20).

In a preferred embodiment, the process is performed in a motor vehicle that is equipped with a so-called adaptive cruise control (ACC) stop-and-go system. The motor vehicle or ACC stop-and-go system has a system for video-based vehicle detection, which is used for the ACC stop-and-go functionality. The video-based vehicle detection takes place on the basis of images of at least one camera utilized by the ACC stop-and-go system. On the basis of images of this camera, an obstacle detection in the area of the vehicle apron can also be carried out, while the vehicle is stopped. This also involves an obstacle detection in the starting range. Current processes and algorithms for the extraction of features and the detection of movements from video data form the basis of the obstacle detection in the starting range of the vehicle.

In the case of driver assistance systems with ACC stop-and-go functionality that are currently used in vehicle series production, the vehicle will, as a rule, automatically start-up again within only a short period of time. After this time period has been exceeded, only a so-called go-request is emitted to the driver with which the driver must not comply, however, without reassuring himself whether a starting-up would be safe. The driver's confirmation signal is therefore "obtained". A suppression of the go-request in the event of the presence of obstacles in the starting range does not take place. For safety reasons, the time period of the automatic starting-up is selected to be correspondingly brief.

In principle, the following applies to motor vehicles having an ACC stop-and-go system: If the vehicle was braked to a stop, for example, at a traffic light, behind another vehicle, it is advantageous for an automatic starting-up or for making the go-request safe to provide a monitoring as to whether "obstacles" (for example, pedestrians, shopping carts, etc.) are situated between the two vehicles and a starting to drive can take place without any risk. The monitoring may be based on images of a camera with image processing on the output side and a corresponding image processing algorithm system.

In the present system used as an example, the position of the front vehicle is detected in the image and, in connection with the own predicted narrow driving space, is used for determining the critical area to be monitored.

For the monitoring, a total of three mechanisms or individual processes are combined in a suitable manner:

a) a motion analysis, for example, by way of processes relating to optical flux or the like, checks for motion in the range to be monitored or for motion into or out of this range;

b) as soon as the own vehicle has come to a stop, a reference image is taken as a template of the range to be monitored. This template is used for a differential-image analysis in order to detect changes and thereby obstacles in the vehicle apron. For avoiding faulty detections, a suitable template update strategy is used;

c) in the image range to be monitored, additionally, robust image features (for example, corners) are extracted, tracked with respect to time, and their spatial distribution is determined. A significant change of this feature signature or of the presence of these features over time in spatially cohesive image ranges allows the conclusion that there are concealments by possible obstacles.

As a result of a suitable combination of the above-mentioned three individual processes, various weak points of the individual processes, such as the detection of objects in the case of a low image contrast and the detection of slowly moving objects, can be effectively lessened or avoided.

In the simplest case, the results of an individual process are checked for plausibility by using the results of at least one other process.

In addition, the different processes supplement one another in that, although objects moving between the own vehicle and the front vehicle can be recognized well by motion analysis alone, it is difficult to judge whether all objects have again left the critical range. When, for example, two pedestrians walk into the critical range behind one another and one of the two stops abruptly while the other leaves the range, as a rule, this can hardly be differentiated from a single pedestrian walking through the critical range. In the former case, the vehicle should then not start driving again; in the latter case, it may. However, in combination with the two other processes, the standing object is easily detectable, so that it is possible to start driving again after one object has been in the critical range.

In addition, the differential-image analysis and the feature tracking supplement one another particularly well in that the feature tracking is still operative or already operative in the case of a slight movement of the vehicles, while the differential-image analysis is operative in image ranges without feature-supplying structural elements. Thus, at least one of the two processes supplies a valid result in every situation.

In combination with an ultrasound-based ranging sensor system, for example, a so-called PDC sensor system of the type in BMW vehicles, areas can additionally be covered into which a camera cannot see.

Furthermore, the dependability or the reliability of the process can be further increased by a sensor based on a different physical measuring principle.

The described system used as an example, in comparison to driver assistance systems currently used in series productions, allows a longer time period during which the drive can be started again autonomously or improves the safety of the go-request of an ACC stop-and-go system.

Camera-based systems have the advantage of largely corresponding to the driver's perception and of having a construction that is oriented according to that perception. They thereby result in a behavior expected of the driver and the surrounding persons.

The described system used as an example offers a significant safety add-on at largely no cost, particularly for video-based ACC systems, which lead to considerable cost advantages in comparison to radar-based ACC systems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for detecting obstacles in a vehicle apron of a vehicle equipped with a longitudinal guidance driver assistance system having a stop-and-go function, wherein information is detectable concerning a vehicle driving ahead by a detection device of the driver assistance system, and wherein the vehicle is automatically brakable to a standing position as a function of the information detected by the detection device, the process comprising the acts of:

beginning at least from a point-in-time wherein the vehicle is stopped, supplying a sequence of individual images of a monitored vehicle apron area by way of a camera;

for detecting obstacles in the vehicle apron area, extracting characteristic image features from the sequence of individual images and tracking the extracted characteristic image features over time within the sequence of individual images;

at least one of: (1) determining and evaluating characteristic image features appearing and/or disappearing in the course of the sequence of individual images to provide obstacle recognition; and (2) determining and evaluating a spatial distribution change of one or more characteristic image features occurring in the course of the sequence in one of a respective individual image and a cutout of the respective individual image.

2. The processing according to claim 1, wherein the act of determining and evaluating the spatial distribution change in the cutout of the respective individual image further comprises:

defining the image cutout in an essentially constant manner by the spatial distribution of the characteristic image features in one or more individual images at a beginning of the sequence for evaluating a remainder or the entire sequence.

3. The process according to claim 1, wherein for detecting obstacles in the vehicle apron, the process further comprises at least one of the acts of:

creating and evaluating differential images in each case from a first individual image and a second individual image taken after the first individual image; and determining and evaluating vectors of an optical flux of image information of at least one portion of image elements of two individual images taken one after another and composed of individual image elements.

* * * * *